March 3, 1931.  C. F. REAGAN  1,794,493
SHOCK ABSORBER
Filed June 14, 1928  2 Sheets-Sheet 1
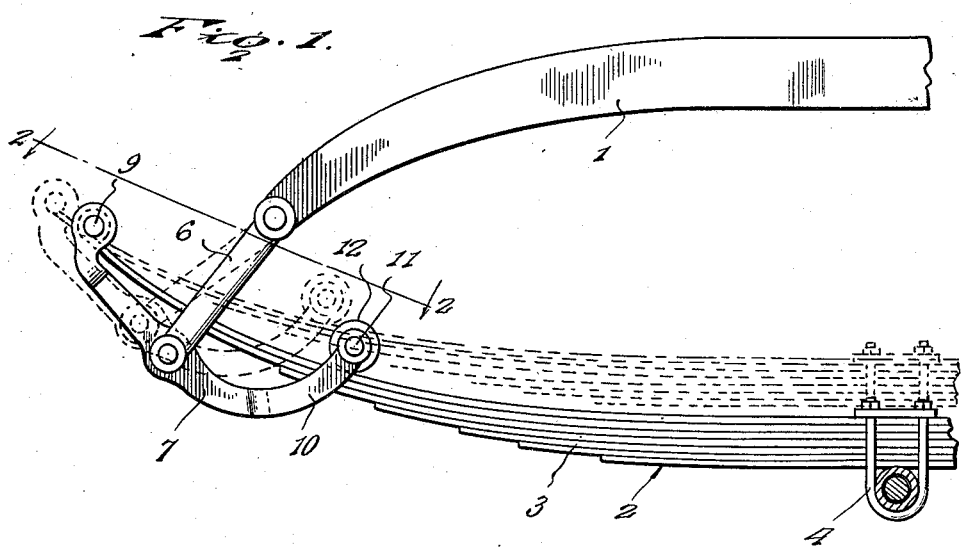
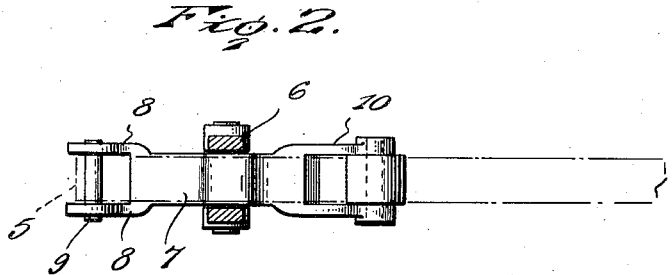
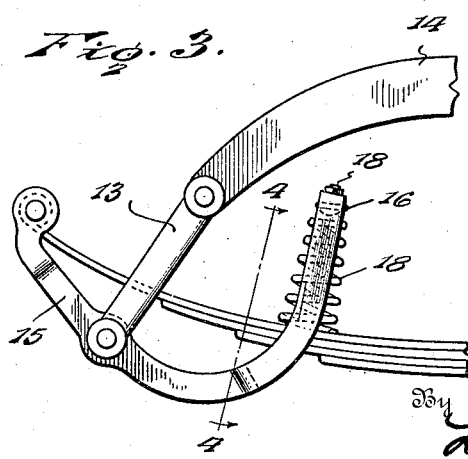
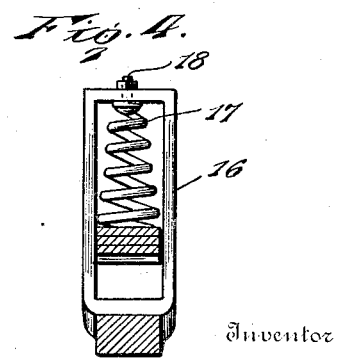
Inventor
C. F. Reagan.
By Lacey & Lacey,
Attorneys March 3, 1931. C. F. REAGAN 1,794,493
SHOCK ABSORBER
Filed June 14, 1928 2 Sheets-Sheet 2
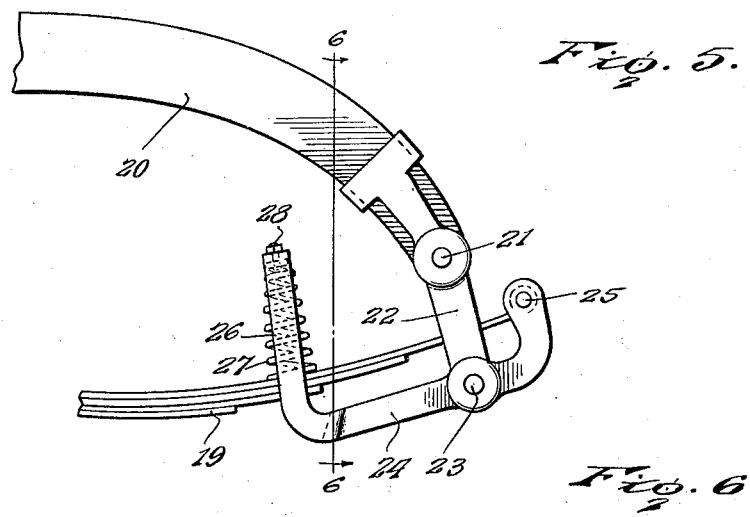
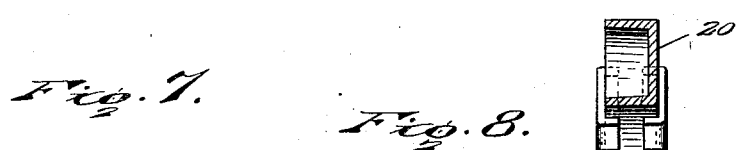
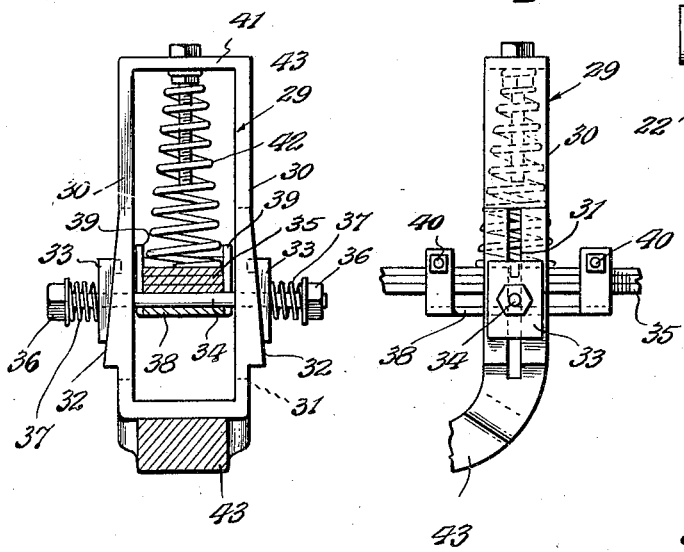
Inventor
C. F. Reagan.
By Lacey & Lacey, Attorneys Patented Mar. 3, 1931

1,794,493

UNITED STATES PATENT OFFICE

CYRIL F. REAGAN, OF ALTOONA, PENNSYLVANIA

SHOCK ABSORBER

Application filed June 14, 1928. Serial No. 285,492.

The present invention is directed to improvements in shock absorbers for motor vehicles.

The primary object of the invention is to provide a device of this character which may be easily and quickly applied to the usual side frame and spring of the vehicle in order that the shock incident to the spring rebounding will be effectively absorbed.

Another object of the invention is to provide a device of this character so constructed that when in place upon the spring the rebound incident to the wheels passing over road obstructions will be effectively retarded in order to materially improve the riding qualities of the vehicle equipped with the devices.

Another object of the invention is to provide a device of this character which can be manufactured at a small cost, which is simple in construction, durable, and one which is efficient in operation.

With these and other objects in view, this invention resides in the novel features of construction, formation, combination and arrangement of parts to be hereinafter more fully described, claimed and illustrated in the accompanying drawing, in which:

Figure 1 is a fragmentary side view of a spring, showing the device in place thereon.

Figure 2 is a sectional view on line 2—2 of Figure 1.

Figure 3 is a fragmentary side view of a modified form of the invention.

Figure 4 is a view on line 4—4 of Figure 3.

Figure 5 is a fragmentary side view of a modified form of the invention.

Figure 6 is a sectional view on line 6—6 of Figure 5.

Figure 7 is an end view, partly in section of another modified form of the invention.

Figure 8 is a fragmentary side view thereof.

Referring to the drawing, 1 designates a portion of the side frame of a vehicle, and 2 the spring, said spring being formed from a plurality of leaves 3, as customary, said spring being secured to the rear axle of the vehicle by a clip 4. The uppermost leaf of the spring 2 is provided with an eye 5, the purpose of which will be later explained.

Having its upper end pivotally connected to the rear end of the bar 1, is a shackle 6, the side arms of which are adapted to span the spring. The lower ends of the side arms of the shackle are pivotally connected intermediate the ends of the arm 7, said arm having furcations 8 upon its rear end which are engaged upon opposite sides of the eye 5 and pivotally connected thereto by a pin 9. The forward end of the arm 7 terminates in upwardly curved fingers 10 which are adapted to span the spring 2, said fingers supporting a pin 11 upon which is journaled a roller 12, which may be formed from rubber or metal, as desired. It will be observed that this roller engages the uppermost leaf 3 of the spring, and owing to the fact that the shackle is connected with the arm 7 intermediate the ends, the roller will be held in tight engagement with the spring in order to absorb the shock and retard the rebound of the spring when the wheels are passing over road obstructions.

In Figure 3, the shackle 13 connects the frame bar 14 and arm 15 in the same manner as in Figure 1, and in this instance the forward end of the arm 15 terminates in a loop 16, said loop having a coil spring 17 confined therein, the upper end of which is fixed to the bight portion of the loop by a bolt 18, the lower end of said spring resting upon the uppermost leaf of the vehicle spring. Obviously, this spring will aid materially in absorbing the shock when the vehicle is encountering road obstructions.

In Figures 5 and 6 the device is shown in connection with the front end of the front spring 19. To the forward end of the side frame 20 is rigidly secured by a bolt 21 a pair of clips 22 which span the spring and have pivotally connected between their lower ends by the bolt 23 the arm 24, the forward upturned fingers of which are pivotally connected to the forward end of the spring by a bolt 25. The rear end of the arm 24 carries a loop 26 in which the spring 19 engages, there being a coil spring 27 engaged in the loop and bearing against the spring 19, the spring 27 being fixed within the loop by the bolt 28. By the application of shock absorbers to the front ends of the front springs the objectional movement imparted to the headlights at night will be eliminated.

Figures 7 and 8 illustrate another form of the invention, and in this instance the loop 29 has its side bars 30 formed with slots 31 and inclined faces 32 upon which slide the beveled plates 33. These plates are engaged with the bolt 34 which engages under the spring 35 and is movable in the slots 31. The bolt has engaged upon its ends nuts 36 and interposed between the nuts and plates 33 are coil springs 37 which serve to hold the plates yieldably engaged with the beveled faces 32.

In order to hold the bolt engaged with the spring 35 a plate 38 is employed and is secured to the spring by ears 39, said ears having bolts 40 passed therethrough for engagement with the upper surface of the spring 35.

Interposed between the upper bar 41 of the loop and the spring 35 is a coil spring 42, said spring being maintained in place by the bolt 43 carried by the bar 41. Obviously the upward movement of the arm 43 which carries the loop 29 will be retarded owing to the fact that the plates 33 will remain stationary as the beveled faces 32 slide thereon. The arm 29 is secured to the spring 35 in the same manner, that the arm 7 is secured to the spring 2.

From the foregoing it is thought that the construction, operation and many advantages of the herein described invention will be apparent to those skilled in the art, without further description, and it will be understood that various changes in the size, shape and proportions and minor details of construction, may be resorted to without departing from the spirit or sacrificing any of the advantages of the invention.

What is claimed is:

1. The combination with the side frame bar and spring of a vehicle, of a shackle pivotally connected to the frame bar, an arm pivotally connected to the shackle below the spring and having one end pivotally connected to the spring, said arm having means upon its free end for engaging the top face of the spring.

2. The combination with the side frame bar and spring of a motor vehicle, of a shackle pivotally connected to the side bar, an arm pivotally connected intermediate its ends to the shackle below the spring and extending longitudinally of the spring, said arm having one end pivotally connected to the spring, the other end of said arm being provided with spaced fingers for spanning the spring, and a roller mounted between the spaced fingers for engaging the top face of the spring.

3. The combination with the side frame bar and spring of a motor vehicle, of a shackle pivotally connected to the bar, an arm pivotally connected to the shackle below the spring and having its rear end pivotally connected to the spring, the forward end of said arm being provided with upwardly curved fingers for spanning the spring, and extending above the spring, a pin supported by the fingers, and a roller engaged upon the pin for engaging the top face of the spring.

In testimony whereof I affix my signature.

CYRIL F. REAGAN [L. S.]